(12) United States Patent  
Schräbler et al.

(10) Patent No.: US 9,245,447 B2  
(45) Date of Patent: Jan. 26, 2016

(54) METHOD AND DEVICE FOR THE POSITION DETERMINATION OF OBJECTS IN ROAD TRAFFIC, BASED ON COMMUNICATION SIGNALS, AND USE OF THE DEVICE

(71) Applicant: Continental Teves AG & Co. OHG, Frankfurt (DE)

(72) Inventors: Sighard Schräbler, Karben (DE); Ulrich Stählin, Eschborn (DE); Marc Menzel, Weimar/Lahn (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 14/359,796

(22) PCT Filed: Nov. 21, 2012

(86) PCT No.: PCT/EP2012/073217  
§ 371 (c)(1),  
(2) Date: May 21, 2014

(87) PCT Pub. No.: WO2013/076132  
PCT Pub. Date: May 30, 2013

(65) Prior Publication Data  
US 2014/0350792 A1 Nov. 27, 2014

(30) Foreign Application Priority Data  
Nov. 21, 2011 (DE) .......................... 10 2011 086 697

(51) Int. Cl.  
*G08G 1/00* (2006.01)  
*G01S 1/04* (2006.01)  
(Continued)

(52) U.S. Cl.  
CPC *G08G 1/165* (2013.01); *B62D 6/00* (2013.01); *G01S 1/04* (2013.01); *G01S 13/003* (2013.01);  
(Continued)

(58) Field of Classification Search  
CPC ............ G01S 1/00; G01S 1/02; G01S 13/88; G01S 13/93

USPC ................... 701/1, 23, 28, 93–98, 117–122, 701/300–302; 342/450–465; 340/901–905, 340/907, 933–943, 435–437  
See application file for complete search history.

(56) References Cited

U.S. PATENT DOCUMENTS 3,242,487 A * 3/1966 Hammack ..................... 342/103  
3,836,960 A * 9/1974 Gehman et al. ................. 342/27  
(Continued)

FOREIGN PATENT DOCUMENTS

DE 195 43 813 A1 5/1997  
DE 10 2007 048 809 A1 7/2008  
(Continued)

OTHER PUBLICATIONS

PCT International Search Report—Mar. 5, 2013.  
(Continued)

*Primary Examiner* — Thomas Tarcza  
*Assistant Examiner* — Tyler J Lee  
(74) *Attorney, Agent, or Firm* — Brinks Gilson & Lione

(57) ABSTRACT

The invention relates to a method for the communication signal-based position determination of objects in road traffic, in which at least one data transporting communication signal is wirelessly transmitted from at least one sender (217, 218, 219, 220, 221, 34) and is reflected at least proportionally as a reflection signal on at least one object (211, 212, 213, 214, 215, 216, 35), wherein the at least one communication signal and the reflection signal are received by a receiver (222, 33), and wherein the of at least one sender (217, 218, 219, 220, 221, 34). The method is characterized in that a propagation time difference of the communication signal and the reflection signal is determined by the received (222, 33). The invention further relates to a corresponding device (100) and to the use thereof.

23 Claims, 5 Drawing Sheets

(51) Int. Cl.
*G08G 1/16* (2006.01)
*G01S 13/00* (2006.01)
*G01S 13/93* (2006.01)
*B62D 6/00* (2006.01)

(52) U.S. Cl.
CPC .............. *G01S 13/931* (2013.01); *G08G 1/161* (2013.01); *G01S 2013/936* (2013.01); *G01S 2013/9342* (2013.01); *G01S 2013/9346* (2013.01)

(56) References Cited

U.S. PATENT DOCUMENTS

| | | | |
|---|---|---|---|
| 3,996,590 A * | 12/1976 | Hammack | 342/465 |
| 4,286,260 A * | 8/1981 | Gershberg et al. | 340/554 |
| 4,733,238 A | 3/1988 | Fiden | |
| 5,160,927 A * | 11/1992 | Cherry et al. | 340/904 |
| 5,614,912 A * | 3/1997 | Mitchell | 342/146 |
| 6,215,438 B1 * | 4/2001 | Oswald et al. | 342/70 |
| 6,411,250 B1 * | 6/2002 | Oswald et al. | 342/70 |
| 6,614,384 B2 * | 9/2003 | Hall et al. | 342/28 |
| 6,633,254 B1 * | 10/2003 | Sutphin | 342/28 |
| 6,930,638 B2 | 8/2005 | Lloyd et al. | |
| 7,205,933 B1 | 4/2007 | Snodgrass | |
| 7,633,426 B2 * | 12/2009 | Sutphin | 342/22 |
| 8,044,839 B2 * | 10/2011 | Sutphin | 342/22 |
| 8,314,732 B2 * | 11/2012 | Oswald et al. | 342/90 |
| 2002/0053982 A1 | 5/2002 | Baugh et al. | |
| 2006/0238407 A1 | 10/2006 | Bourdelais et al. | |
| 2011/0243454 A1 * | 10/2011 | Miyajima | 382/195 |
| 2012/0112953 A1 * | 5/2012 | Grau Besoli et al. | 342/146 |

FOREIGN PATENT DOCUMENTS

| | | |
|---|---|---|
| DE | 10 2007 058 192 A1 | 6/2009 |
| DE | 10 2008 061 304 A1 | 7/2009 |
| DE | 10 2009 019 905 A1 | 11/2010 |
| DE | 10 2010 029 744 A1 | 2/2011 |
| DE | 10 2011 077 998 A1 | 1/2012 |
| DE | 10 2011 079 052 A1 | 3/2012 |
| EP | 1 040 364 B1 | 4/2005 |

OTHER PUBLICATIONS

German Examination Report—Feb. 28, 2013.
Wikipedia—Map Matching.
Potential and Limitations of Froward-Looking Bistatic SAR—I. Wlaterscheid et al.
Parametrizaton of Joint OFDM-based Radar and Communication Systems for Vehicular Applications—Martin Braun et al.

* cited by examiner

METHOD AND DEVICE FOR THE POSITION DETERMINATION OF OBJECTS IN ROAD TRAFFIC, BASED ON COMMUNICATION SIGNALS, AND USE OF THE DEVICE

CROSS REFERENCE TO RELATED APPLICATIONS

This application claims priority to German Patent Application Nos. 10 2011 086 697.3, filed on Nov. 21, 2011; and PCT/EP2012/073, filed Nov. 21, 2012.

FIELD OF THE INVENTION

The invention relates to a method for the communication signal-based position determination of objects in road traffic and a device for the communication signal-based position determination of objects in road traffic and the use thereof.

BACKGROUND

A multiplicity of different sensor devices for environment detection are already known in the prior art. Examples of sensors that are customary and suitable for environment detection are, for instance, mono or stereo camera devices, radar devices and ultrasonic devices. It is likewise known not only to obtain but also to transmit information about the vehicle surroundings by means of wirelessly transmitting vehicle-to-X communication devices. Overall, there is emerging a rapid and clear development toward more and more and ever more reliable vehicle systems which are capable of acquiring information by means of a multiplicity of different devices. In this case, the more different the operative principles of said devices, the better suited the devices that a common vehicle system are to validating the respectively acquired information among one another.

In this context, DE 10 2008 061 304 A1 describes a vehicle-to-X communication device for a vehicle for wirelessly transmitting vehicle-relevant data. In this case, said data are transmitted to vehicles in the surroundings or to infrastructure devices. The communication device described includes two separate communication units, wherein the first communication unit is embodied on the basis of a WLAN connection and the second communication unit is embodied on the basis of a remote keyless entry (RKE) connection.

DE 10 2007 048 809 A1 describes a method and a device for recognizing hidden objects in road traffic. In this case, the surroundings of a vehicle are firstly detected by means of sensors and corresponding information is subsequently transmitted to vehicles situated in the environment by means of an interface for vehicle-to-vehicle communication. The transmitted information is received by the vehicles in the surroundings and used by them to extend an environment model, such that the environment model also includes information about objects which cannot be detected by the respective vehicle in the surroundings itself. Furthermore, a situation analysis of the environment model extended in such a way and also an assessment of the situation of the own vehicle are carried out.

DE 10 2007 058 192 A1 discloses a central control unit for a plurality of assistance systems which are provided in a motor vehicle and which are at least partly equipped with environment sensors, wherein in accordance with DE 10 2007 058 192 A1 a telematics system is also understood as an environment sensor. The central control unit is connected to the individual assistance systems at the data level and plausibilizes the information of individual environment sensors by means of the information of other environment sensors. By way of example, the image information of a camera can confirm the distance measurement of a radar sensor. Individual sensor information items can thus be confirmed and are present in a redundant fashion. Such a coupling of individual signals of different sensors is also known as sensor fusion.

What is disadvantageous about the methods and devices known from the prior art, however, is that a multiplicity of different sensors of different sensor types are required for the reliable and in particular redundant detection of objects, which is in turn associated with a comparatively high expenditure in terms of costs. If information about an object is detected by means of vehicle-to-X communication, in general it is additionally necessary for said information, prior to processing and in particular prior to use in a safety-relevant assistance system, to be subjected to a computationally complex authenticity method or to be validated by means of environment sensor information, since a malicious sender can deliberately transmit incorrect information.

Therefore, the invention addresses the problem of proposing a method which, while avoiding losses of information and losses in terms of safety, helps to reduce the multiplicity of sensors required in accordance with the prior art.

This problem is solved according to the invention by means of the method for the communication signal-based position determination of objects in road traffic as described herein.

IN SUMMARY AND INTRODUCTORY DESCRIPTION OF THE INVENTION

In accordance with the method according to the invention for the communication signal-based position determination of objects in road traffic, in which at least one data-transporting communication signal is transmitted wirelessly by at least one sender, wherein the at least one communication signal is reflected at least proportionally as a reflection signal at least one object, and wherein the at least one communication signal and the reflection signal are received by a receiver, the receiver knows its own position and a location of the at least one sender. The method is distinguished by the fact that a propagation time difference between the communication signal and the reflection signal of the at least one communication signal is determined by the receiver.

The invention thus affords the advantage that a position determination of objects which lie in the propagation field of the communication signals and reflect the latter takes place by means of a wireless communication signal or in the context of a wireless communication process. Since objects in road traffic are typically motor vehicles, which, on account of their metallic construction, have comparatively good reflection properties with regard to the communication signals, the reflection signal is also comparatively strong and readily detectable. Consequently, without additional sensor outlay, it is possible to determine the position of the objects solely by means of the communication signals of a suitable, wirelessly transmitting communication device. In this case, it is not even necessary for the receiver likewise to be capable of transmitting the communication signals used for the position determination. Consequently, the invention demonstrates a cost-effective as well as effective method for determining the position of objects.

It is furthermore advantageous that a range Doppler method known per se is applied to the communication signal and the reflection signal, which method is also applied in the case of imaging "synthetic aperture radar" known per se and in the case of "4D pulse Doppler radar" likewise known per se. In the case of the range Doppler method, received signals are represented in a digital map containing the determined Doppler frequency over the distance between the object and the receiver.

By means of the propagation time difference between the communication signal from the sender to the receiver and the reflection signal from the sender to the object and from the object to the receiver, according to the invention, preferably, a difference in the distance covered between the communication signal and the reflection signal is firstly determined by means of the known speed of propagation of the communication signal and of the reflection signal.

It is preferably provided that an ellipse is determined from the propagation time difference, the own position and the location, the circumferential line of said ellipse containing a position of the at least one object. Since the receiver knows both its own position and the location of the sender, it can firstly determine the distance from the sender to the receiver. Consequently, by means of the known distance from the sender to the receiver and the distance difference resulting from the propagation time difference, it is also possible to determine the absolute distance from the sender via the object to the receiver. The receiver thus in other words fundamentally determines an ellipse, on the circumferential line of which the object must be situated and at one focus of which the sender is situated and at the other focus of which the receiver is situated.

The position determination fundamentally takes place in all directions around the receiver and, in contrast to environment sensors usually used, is not restricted to a spatial segment region. The sole possible restriction of the detection region consists in shadings of the antenna or antennas used for reception in a communication device that receives the communication signal and reflection signal in relation to specific spatial directions, e.g. as a result of structural design stipulations of the communication device. However, this is a special case and can be avoided by means of a corresponding arrangement of the antenna or else of a plurality of antennas, such that a position determination with a detection angle of 360° around the receiver is actually possible.

Since every object gives rise to an ellipse, from this it is also possible, for example, to effect a simple classification of the environment of the receiver which at least indicates whether many or few objects are situated in the environment of the receiver. Additional ellipses that arise as a result of additional senders can be identified by balancing of the received communication signals and reflection signals, such that a multiplicity of senders do not result in an incorrect classification.

It is preferably provided that a Doppler frequency generated by a relative movement of the object with respect to a baseline between the receiver and the sender is determined by the receiver from the at least one communication signal and the reflection signal of the at least one communication signal. In this case, the Doppler frequency arises solely from the relative movement of the object with respect to the baseline and can be determined by balancing the frequencies of the communication signal with the reflection signal. In this case, the Doppler frequency is proportional to the speed of the object in the direction of the baseline. Consequently, additional information about an object can be detected by means of the Doppler frequency.

The method is preferably distinguished by the fact that the at least one Doppler frequency is determined by mixing the at least one communication signal with the associated reflection signal. This constitutes an uncomplicated and efficient possibility for determining the Doppler frequency. As a result of the mixing, the receiver obtains the difference frequency between the frequency of the communication signal and the frequency of the reflection signal. This difference frequency corresponds to the Doppler frequency. Particularly preferably, the mixing is implemented by means of a complex conjugate multiplication, since this requires comparatively particularly little electronic computational complexity and is thus possible without any problems even with comparatively inexpensive computation modules. Alternatively particularly preferably, so-called programmable hardware (FPGA, field programmable gate array) or a so-called application specific integrated circuit (ASIC) is used. A combination of the mixing method by means of the complex conjugate multiplication and the use of programmable hardware or application specific integrated circuits is also possible.

In accordance with a further preferred embodiment of the invention, it is provided that the Doppler frequency is filtered by means of a low-pass filter, in particular by means of a digital low-pass filter. This has the effect that—depending on the design of the low-pass filter—Doppler frequencies which exceed a specific limit frequency are filtered and not used for further evaluation. In accordance with one particularly preferred embodiment, the low-pass filter is designed in such a way that Doppler frequencies generated by differential speeds of more than 400 km/h are filtered.

In particular, the digital low-pass filtering is followed by undersampling of the received signals, known per se. This considerably reduces the computational complexity for the respective subsequent fast Fourier transformation. Preferably, only uncomplicated fast Fourier transformations are computed since low Doppler frequencies have to be reckoned with (on account of differential speeds usually lower than 400 km/h). As a result of reckoning with such low Doppler frequencies, correspondingly shortened latencies arise as well. This is advantageous in the case of traffic position finding, since up-to-date data about target objects are always required. The tolerable latencies in this context are preferably shorter than 250 ms.

In some conventional wireless communication techniques, the case can occur, moreover, that a communication signal or reflection signal or an individual communication packet is temporally too short to determine the Doppler frequency directly, since not enough zero crossings occur. In this case, the Doppler frequency is preferably determined from the phase angle of the communication signal or of the reflection signal or of the communication packet by the phase angle being detected at each case at the start and at the end of the communication signal or of the reflection signal or of the communication packet and being projected e.g. by means of linear extrapolation, such that the Doppler frequency can subsequently be determined from the extrapolation.

Expediently, it is provided that the receiver, as a result of temporal observation of a change in the Doppler frequency, assigns thereto a relative-speed-dependent distance curve, the profile of which contains the position of the at least one object. If both the receiver and the sender are in motion, the relative-speed-dependent distance curve in this case describes a curved line. From every point of this line, an object situated on the line would generate an identical Doppler frequency at the receiver.

If, in particular, both the sender and the receiver are at rest, the relative-speed-dependent distance curve substantially constitutes a straight line which bends twice and the first bend of which is at the location of the receiver and the second bend of which is at the location of the sender. In this case, the receiver and the sender themselves are thus connected rectilinearly by the straight line. As a result of an ambiguity that occurs, the straight line forks both at the location of the receiver and at the location of the sender, as a result of which ultimately in each case two straight lines proceed from the location of the receiver in the direction facing away from the sender and also from the location of the sender in the direction facing away from the receiver.

The relative-speed-dependent distance curve determined in this way can be superimposed on the ellipse determined previously. In this case, the relative-speed-dependent distance curve and the ellipse intersect at a maximum of four different locations. The object whose position is intended to be determined is situated at one of these locations. The object position determination can be improved further as a result of this delimitation of the possibilities in respect of whereabouts.

In particular, it is expediently provided that the change in the Doppler frequency is assigned to the relative-speed-dependent distance curve by means of a fast Fourier transformation. The fast Fourier transformation has proved to be particularly suitable in this context.

Furthermore, it is preferred for the receiver to be also capable of transmitting data-transporting communication signals. This affords the advantage that the receiver itself can also transmit communication signals and can thus be utilized as a sender within the meaning of the invention for other receivers, e.g. other vehicles, in its surroundings. Consequently, the other receivers, by means of the communication signals and the associated reflection signals, can likewise be able to perform a position determination by means of the method according to the invention.

Preferably, the low-pass filtering already described is applied continuously to the Doppler frequency determined, while the fast Fourier transformation relative to the occasion is preferably performed with one to ten computation steps per second.

Moreover, it is advantageous that in the case of a multiplicity of senders and a multiplicity of communication signals which are reflected in each case at least proportionally as a multiplicity of reflection signals at the at least one object, the receiver determines in each case a multiplicity of propagation time differences from the multiplicity of communication signals and the associated reflection signals. Consequently, the method according to the invention can advantageously be employed even in the case of a multiplicity of different senders. It is important in this case to assign the associated reflection signal to each communication signal. In general, this is possible in a simple manner by means of the transmission frequency of the communication signal and of the reflection signal.

In particular, it is advantageous that the receiver determines a multiplicity of ellipses from the multiplicity of propagation time differences, wherein at least one intersection point of the multiplicity of ellipses contains the position of the at least one object. In other words, a multiplicity of ellipses are thus determined, at one focus of which in each case the receiver is situated and at the other focus of which in each case one of the senders is situated. The ellipses therefore inevitably generate intersection points, the object being situated at one of the intersection points. By means of a temporal observation and an observation of the spatial shift of the intersecting points, the actual position of the object can be delimited further and the position determination can be improved further. The observation of the spatial shift can be effected e.g. in the form of a target tracking which discards physically impossible changes.

If a multiplicity of objects are situated in the surroundings of the receiver, then each sender generates an additional ellipse by means of each additional object.

Moreover, it is particularly advantageous that the method is performed by a multiplicity of receivers, wherein the receivers exchange data describing the intersection points among one another by means of the communication signals. This affords the advantage that each receiver obtains additional information from the other receivers in its surroundings or within reception range, which additional information, for said receiver, makes possible an additional position determination of additional objects or makes possible an improved position determination of objects already detected. The improved position determination results, in particular, from the different positions of the multiplicity of receivers, since these lie at different foci of different ellipses. Since an intersection point is therefore viewed as it were from different directions, its position can be determined more accurately by means of triangulation.

Furthermore, it is expedient that the receiver determines a multiplicity of generated Doppler frequencies from the multiplicity of communication signals and the multiplicity of reflection signals as a result of a multiplicity of relative movements of a multiplicity of objects with respect to a baseline between the receiver and the sender. The receiver therefore determines for each object a dedicated Doppler frequency assigned to the object.

In this case, too, the Doppler frequencies are preferably filtered by means of a low-pass filter in order to keep the subsequent electronic computational complexity within practical limits.

In particular, it is furthermore expedient that the receiver, as a result of temporal observation of changes in the multiplicity of Doppler frequencies, assigns to the multiplicity of Doppler frequencies in each case a relative-speed-dependent distance curve, the profiles of which contain the position of the at least one object. The assignment of the change in the Doppler frequency to the relative-speed-dependent distance curves is preferably effected by means of fast Fourier transformation, which has proved to be particularly suitable in this context, too.

Preferably, it is provided that the at least one relative-speed-dependent distance curve and the at least one ellipse are superimposed on a digital position map, wherein the intersection points of the at least one relative-speed-dependent distance curve and the at least one ellipse contain the position of the at least one object. As a result of the superimposition of the ellipses and the relative-speed-dependent distance curves, the actual positions of the objects can be delimited further and the position determination of the objects can thus be improved.

In particular, it is preferred for the at least one relative-speed-dependent distance curve to be superimposed on a road map contained in digital map material, wherein the at least one position of the at least one object is assigned exclusively to a road noted in the digital road map. This affords the advantage that a possible position of an object can be delimited further, since positions which do not lie on a road noted in the digital road map are rejected. In other words, only the positions which lie on a road are taken into consideration as actual position for the position determination. Since objects in road traffic are usually situated on a road, as a consequence generally no incorrect identifications are caused.

It is particularly preferred for the at least one ellipse to be superimposed on a road map contained in digital map material, wherein the at least one position of the at least one object is assigned exclusively to a road noted in the digital road map. By virtue of the fact that the ellipses are also superimposed on a road map contained in digital map material, this affords the advantage here, too, that only those positions which lie on a road are taken into consideration as actual position for the position determination.

In accordance with a further preferred embodiment of the invention, it is provided that the location of the at least one sender is gathered from the digital map material. This affords the advantage that the sender does not have to regularly transmit its location by means of the communication signal. Instead, the receiver identifies the sender, e.g. a radio transmitter, on the basis of its transmission frequency and gathers its location from the digital map material. This simplifies and accelerates the method according to the invention.

Expediently, it is provided that the data transported in the multiplicity of communication signals are evaluated at least proportionally by the receiver. This affords the advantage that a communication process that usually takes place can continue to be performed without being influenced and without being restricted. The method according to the invention therefore leads to no restriction whatsoever of the communication capability of the receiver.

Moreover, it is advantageous that the location of the at least one sender and/or of the receiver is contained in the data transported by the communication signal. This is advantageous particularly if the sender is a mobile sender such as e.g. a vehicle capable of vehicle-to-communication. Moreover, in the case of a stationary sender, e.g. a radio or television transmitter, the location contained in the data transported by the communication signal can be matched with the location contained in the digital map material, in order to verify this location.

Moreover, it is preferred for the at least one communication signal to be a communication signal of one of the following communication types:
WLAN communication, in particular according to IEEE 802.11p,
WiFi direct communication,
ISM communication (Industrial, Scientific, Medical band), in particular by means of a locking device having a radio link capability,
Bluetooth communication,
ZigBee communication,
UWB communication (Ultra Wide Band),
WiMax communication (Worldwide Interoperability for Microwave Access),
remote keyless entry communication,
mobile radio communication, in particular GSM communication, GPRS communication, EDGE communication,
UMTS communication,
LTE communication,
infrared communication,
radio communication and
TV communication.

In this case, the mobile-radio-based communication means are particularly preferably assigned to an automatic emergency call module. The types of connection presented afford different advantages and disadvantages with regard to their communication properties, depending on type, wavelength and data protocol used. WLAN connections enable e.g. a high data transfer rate and a fast connection set-up. ISM connections, by contrast, offer only a lower data transfer rate, but are outstandingly suitable for transmitting data around obstacles to visibility. Infrared connections in turn likewise offer a low data transfer rate. Finally, mobile radio connections are not adversely affected by obstacles to visibility and offer a good data transfer rate. In return, however, the connection set-up of mobile radio connections is comparatively slow.

An automatic emergency call module is also known as a so-called eCall module.

Since it is not necessary for the communication by means of the communication types utilized for position determination to be bidirectional, the abovementioned communication types usually embodied in a monodirectional fashion, such as radio communication and TV communication, are also preferably used in the sense of the invention.

A further advantage when using stationary analog or digital transmitters, such as e.g. radio and television stations, is that the location of the corresponding transmission masts can be gathered from a map. In this case, the Doppler frequency can also be used for evaluation in a particularly simple manner because at least the transmitter does not move. A possible ambiguity in the position of an object can thus be resolved in a comparatively simple manner.

In general, a communication type is used all the more preferably for use according to the invention, the greater its possible transmission bandwidth, since a greater bandwidth enables a more accurate position determination.

Furthermore, it is preferred for the transported data and/or the positions determined to be forwarded to at least one driver assistance system. Consequently, both the transported data and the positions determined—if appropriate also jointly—can be processed by a corresponding driver assistance system and be used for driver assistance.

In particular, it is preferred for the location indications contained in the transported data to be validated by means of the positions determined.

Moreover, it is preferred, in particular, for the driver assistance system to be designed to perform an autonomous braking intervention and/or an autonomous steering intervention and/or a warning of a driver. This enables a safety-increasing utilization of the available information and data.

The present invention furthermore relates to a device for the communication signal-based position determination of objects in road traffic, including a communication unit for wirelessly receiving and transmitting data-transporting communication signals and for wirelessly receiving reflection signals of the communication signals, said reflection signals being reflected at objects, and location determining means for determining locations of senders of communication signals, and own position determining means for determining the device's own position. The device is distinguished by the fact that the device furthermore includes propagation time difference determining means, and that the device performs in particular the method according to the invention. Since the system according to the invention thus includes all means necessary for performing the method according to the invention and performs in particular the method according to the invention, the advantages already described arise therefrom.

Preferably, it is provided that the device furthermore comprises includes Doppler frequency determining means for determining Doppler frequencies generated as a result of relative movements of the objects with respect to a baseline between the receiver and the sender. In this case, the Doppler frequency is determined in particular preferably by the mixing of a communication signal with its associated reflection signal. Accordingly, the Doppler frequency determining means includes in particular preferably a signal mixer and especially preferably in addition a low-pass filter, in particular a digital low-pass filter, and if appropriate a computation module for computing fast Fourier transformations.

Expediently, the receiver is additionally designed for receiving broadband signals and includes a quadrature demodulator known per se. The quadrature demodulator makes it possible to distinguish approaching objects and objects moving away by means of the sign of the Doppler frequency determined.

In particular, it is preferred for the device furthermore to include distance assigning means which, as a result of temporal observation of a change in the Doppler frequencies, assign thereto in each case a relative-speed-dependent distance curve, the profiles of which contain the position of the at least one object. This enables an improved object position determination, since additional information describing the position of the object is thus available.

Advantageously, it is provided that the communication unit is designed for simultaneously transmitting and receiving. In order to ensure simultaneous transmitting and receiving of the communication unit, the latter is expediently provided with separate transmitting and receiving antennas or includes a so-called circulator known per se or a directional coupler or a ring line.

Simultaneous transmitting and receiving can be realized either by means of a directional coupler, a circulator, a ring line or by means of separate antennas for the transmitting unit and the receiving unit. If the position determination is carried out by means of a different communication type not used by the receiver itself for transmission, such as e.g. TV communication, then separate antennas are generally used. The additional outlay for the capability of position determination in comparison with the pure communication function is comparatively low, since the signal processing and the evaluation are performed for the most part with the means that are required anyway for the communication device. Moreover, since the receiver components are for the most part already paid for by the main application, namely the vehicle-to-X communication, only a comparatively low surcharge arises.

Moreover, it is provided that the location determining means are electronic evaluation means for evaluating at least one proportion of the data and evaluate a location designation of the sender contained in the transported data and/or are a digital memory which contains digital map material and in which a multiplicity of locations of a multiplicity of senders are designated. Consequently, two different possibilities for location determination are available, which particularly preferably are also utilized in parallel. The first-mentioned possibility for location determination from the location designation contained in the transported data in this case affords the advantage of comparatively high flexibility and cost-effectiveness, since the received data are generally evaluated anyway. The second-mentioned possibility for location determination by means of digital map material, by contrast, is independent of additional information and therefore does not rely on the sender describing its location in the data transported by the communication signal.

Preferably, it is provided that the own position determining means are a global satellite navigation system and/or are an environment sensor-based map matching system. Global satellite navigation systems, such as e.g. GPS, are already widespread and present as standard in many vehicles. Moreover, these systems are comparatively reliable and accurate. One alternative thereto is so-called map matching systems, which identify their surroundings by means of environment sensors and can thus assign the own position to a spatial position in digital map material. Particularly preferably, a combination of the two systems mentioned is utilized in order to improve the reliability and accuracy of the own position determined.

The present invention furthermore relates to a use of the device according to the invention in a motor vehicle.

BRIEF DESCRIPTION OF THE DRAWINGS

Further preferred embodiments are evident from the dependent claims and the following description of an exemplary embodiment with reference to figures.
In the figures.

FURTHER DESCRIPTION OF THE INVENTION

Figure 1:
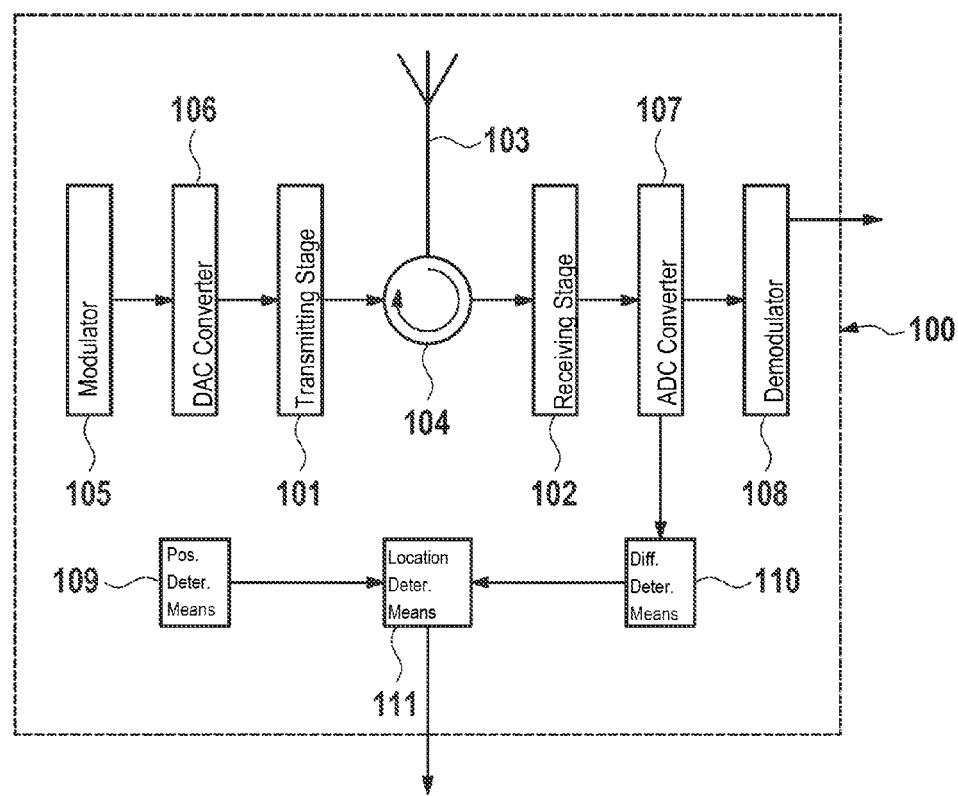
FIG. 1 shows an exemplary construction of a device according to the invention for performing the method according to the invention.

FIG. 1 shows an exemplary as well as schematic construction of device 100 according to the invention for the communication signal-based position determination of objects in road traffic. Device 100 includes a communication unit consisting of transmitting stage 101 for transmitting communication signals, receiving stage 102 for receiving communication signals and reflection signals, and antenna 103, which is utilized both for transmitting and for receiving, and circulator 104. Antenna 103 is electrically connected both to transmitting unit 101 and to receiving unit 102 via circulator 104. By means of circulator 104, antenna 103 can be utilized both for transmitting and for receiving information. Furthermore, device 100 includes modulator 105 for modulating data to be transported into a communication signal to be transmitted, digital-to-analog converter 106 for converting digital data into analog signals, analog-to-digital converter 107 for converting analog signals into digital data, and demodulator 108 for demodulating received communication signals and reflection signals. Furthermore, device 100 includes own position determining means 109 in the form of a GPS sensor, propagation time difference determining means 110 in the form of an electronic computation unit for determining a propagation time difference between the communication signal and the reflection signal in each case on the path from the sender to the receiver, and location determining means 111 for determining an ellipse around the sender and around the receiver, on the circumferential line of which ellipse lies the position of the object generating the reflection signal. Location determining means 111 are likewise embodied as an electronic computation unit. Device 100 is designed according to the example for communication by means of WLAN according to IEEE 802.11p, wherein it communicates via two channels each having a bandwidth of 10 MHz and separated by a third, unused channel likewise having a bandwidth of 10 MHz.

Figure 2A:
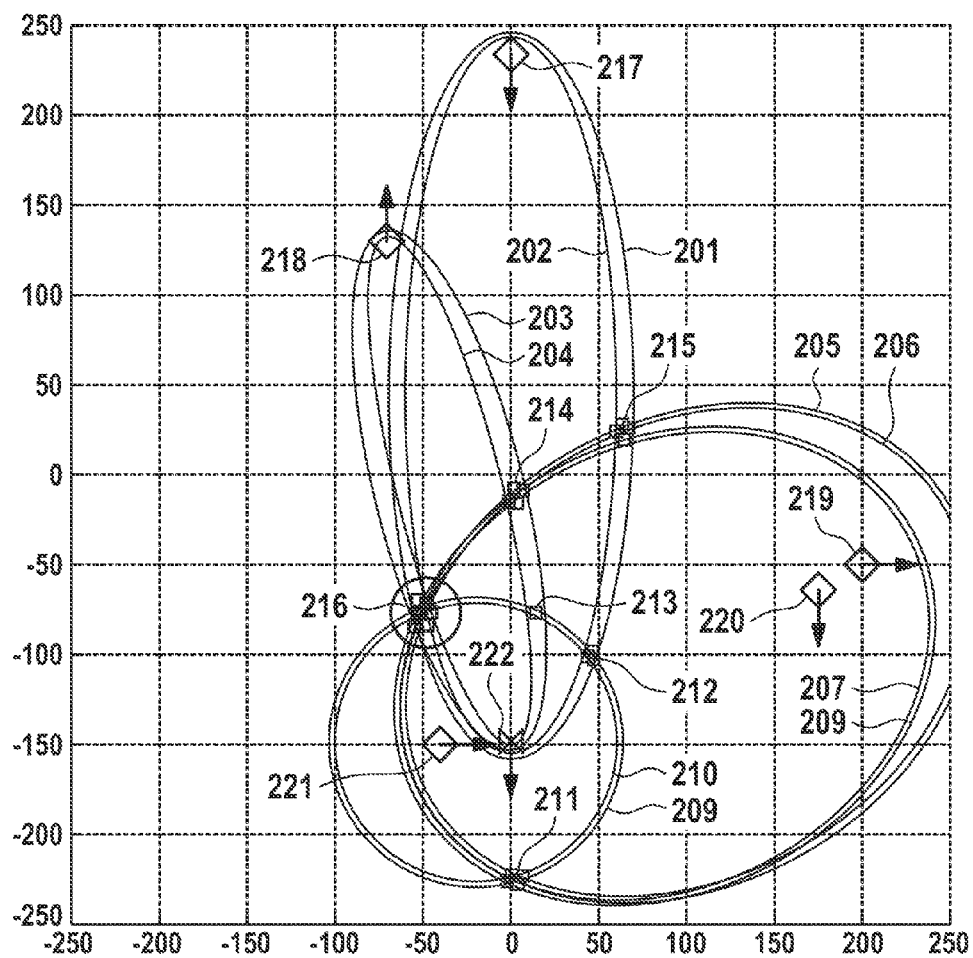
FIG. 2 shows a temporal series of a multiplicity of changing ellipses.

FIG. 2a shows ellipses 201-210, the intersection points of which describe possible positions of objects 211-216 in accordance with the method according to the invention. In each case different senders 217-221 and in each case identical receiver 222 lie at the respective foci of the ellipses. According to the example, only object 216 actually exists, while objects 211-215 are so-called "ghost targets", that is to say objects that do not exist in reality. Whether objects 211-216 are actual objects or ghost targets is not yet known to the receiver, however, at the time of determining ellipses 201-210. Ghost targets can be identified as such in the further course by temporal observation of the intersection points of ellipses 201-210 by means of statistical methods. Since senders 217-221 and receiver 222 are moving vehicles, the speed thereof is represented in each case by an arrow pointing in the direction of travel.

Figure 2B:
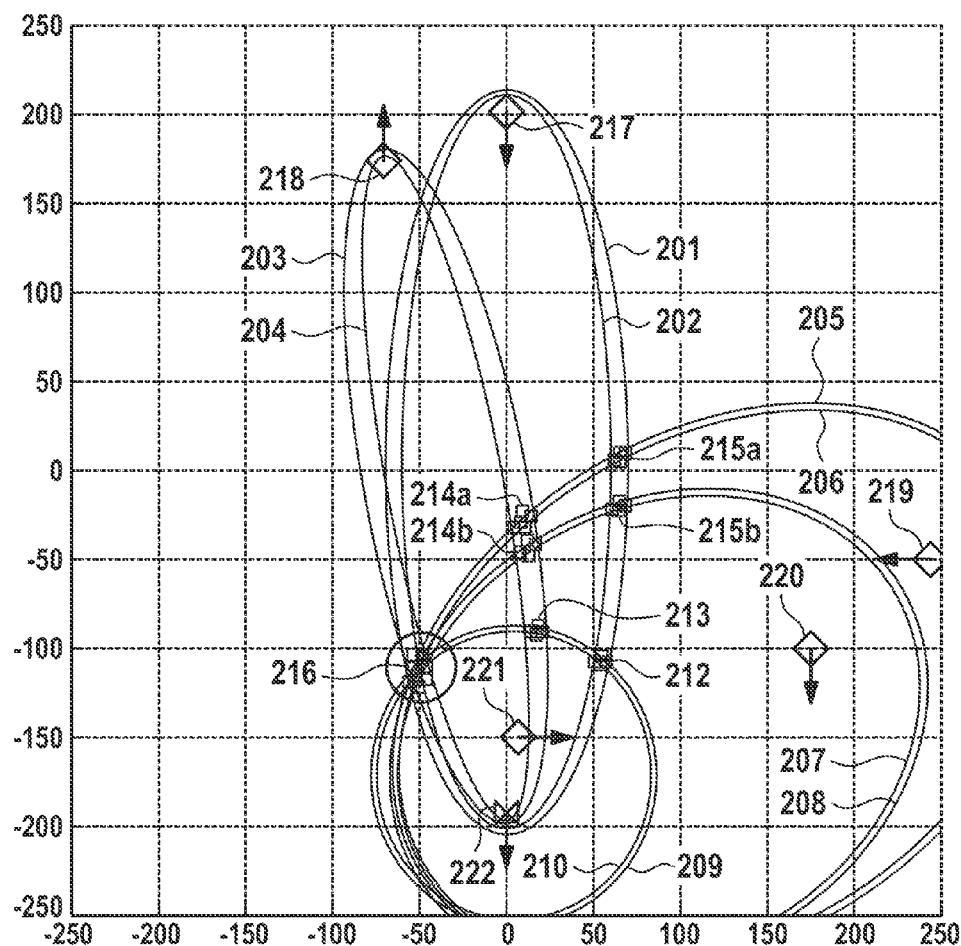

FIG. 2b illustrates once again the same situation as FIG. 2a, but after a time period of 1.5 s has elapsed. Since senders 217-221 are vehicles, the latter have moved relative to receiver 222, which is likewise a vehicle. Accordingly, a shift in the ellipses has taken place, which has also led to a shift in the positions of the intersection points and thus to a shift in the positions of possible objects 211-216. As can be seen, ghost targets 213 and 214 have split into in each case two ghost targets 213a, 213b and 214a, 214b.

Figure 2C:
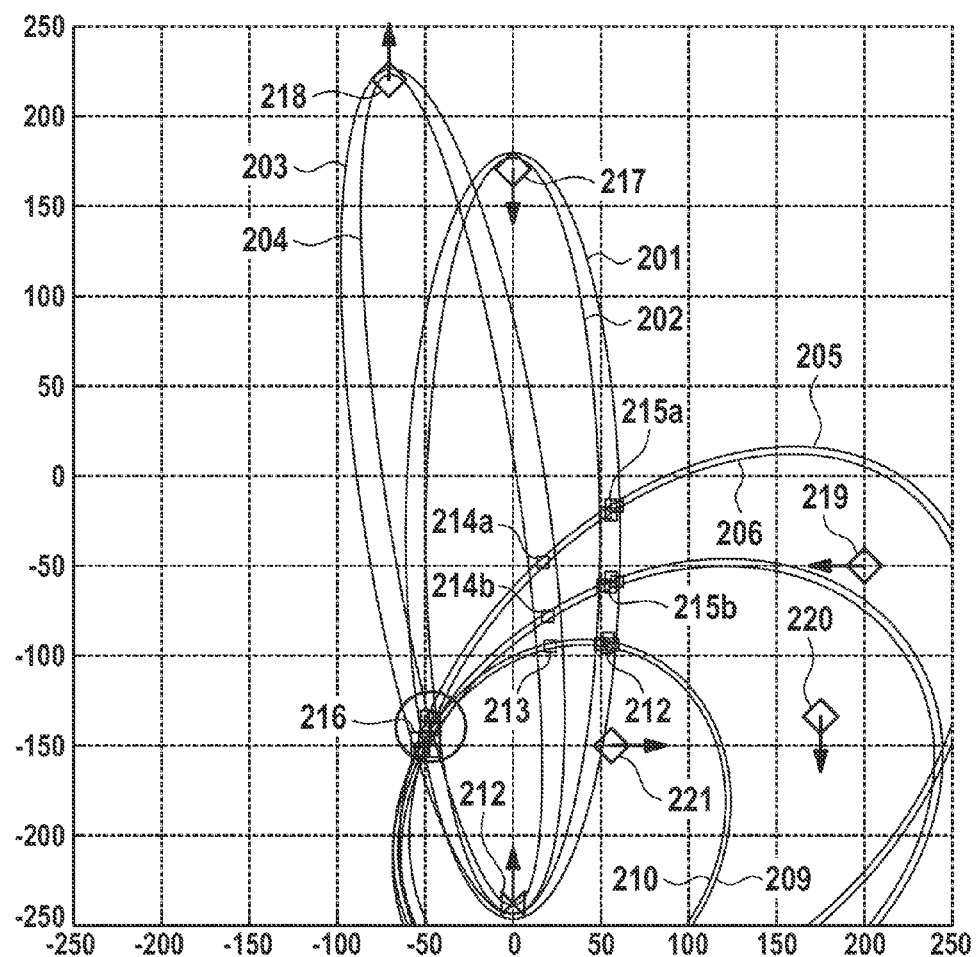

FIG. 2c again reveals the situation already described but this time after an additional time duration of 1.5 s has again elapsed. Since ghost targets 212, 213, 214a, 214b, 215a and 215b have an unusual movement behavior and, moreover, their position cannot be assigned to a road course stored in a digital map, they are identified as ghost targets and rejected.

Actually existing object 216, by contrast, has a uniform movement behavior typical of vehicles and can be assigned to a road course stored in a digital map. Consequently, object 216 is identified as actually existing.

Figure 3:
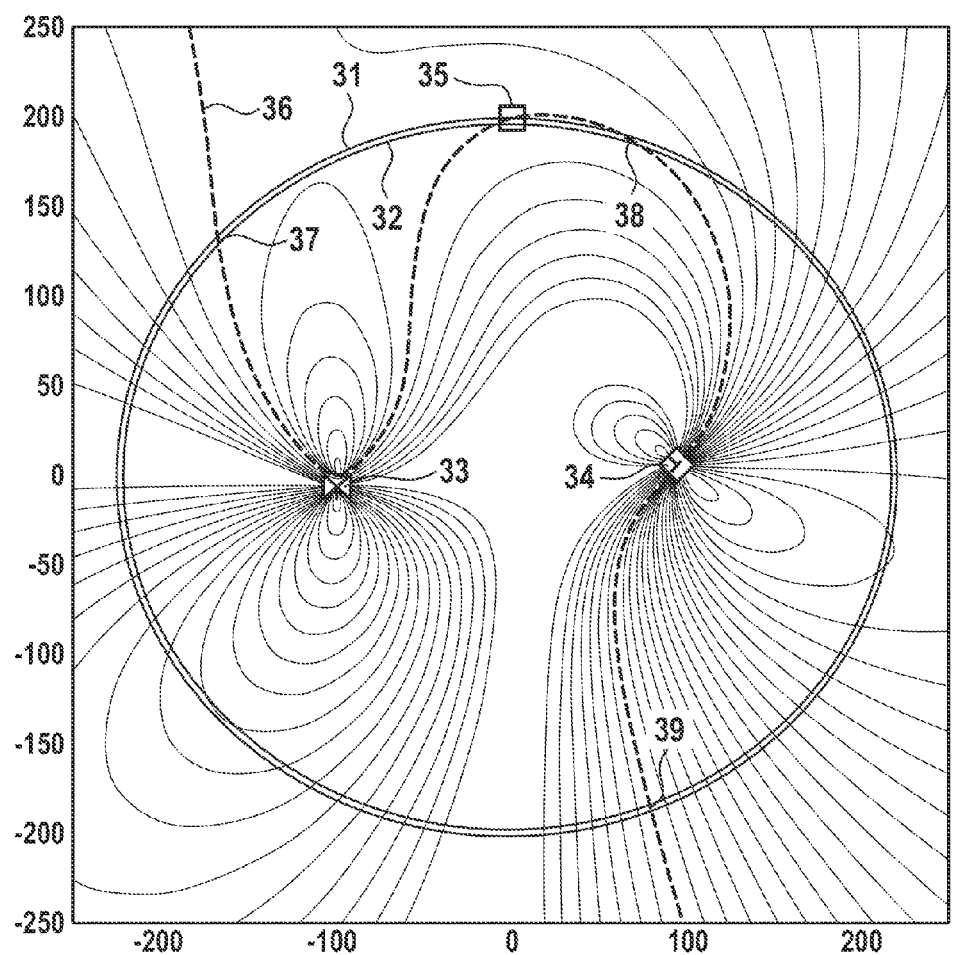
FIG. 3 shows a superimposition of a relative-speed-dependent distance curve with two ellipses.

FIG. 3 shows a superimposition of a relative-speed-dependent distance curve 36 with two ellipses 31 and 32, which are formed in a virtually circular fashion according to the example. Receiver 33 lies at a first focus of ellipses 31 and 32, while sender 34 lies at a second focus of ellipses 31 and 32. The lines shown white in FIG. 3 are lines of the same Doppler frequency. A Doppler frequency measured by receiver 33 decreases with increasing proximity to object 35, passes through a zero crossing upon object 35 being passed, and increases with a negative sign as distance to target object 35 subsequently increases again. Distance curve 36 intersects ellipses 31 and 32 at four locations 35, 37, 38 and 39. Consequently, receiver 33 knows four possible positions of object 35. Receiver 35 can resolve this ambiguity in the position of object 35 by temporal observation of the movement behavior of object 35 and thus determine the actual position of object 35.

In accordance with a further exemplary embodiment (not illustrated), the device according to the invention includes at least one broadband receiving unit in the form of an analog television receiver having a bandwidth of 5 MHz at the baseband output. As a result of a frequency change across different transmitters, it is possible to create a map with the positions of the objects. So-called inflectors as objects are comparatively well suited to this since they reflect the communication signals over comparatively far distances. Pure back-reflections can, by contrast, often no longer reach the receiver in this case. The objects lie on the intersection points of ellipses, at one focus of which the receiver is situated and at the other focus of which the respective sender is situated. The differentiation of the actually existing objects from the ghost targets takes place by means of temporal observation and so-called Markov movement models. If the position or the location of sender, receiver or object changes, the ghost targets can be differentiated from genuine objects.

While the above description constitutes the preferred embodiment of the present invention, it will be appreciated that the invention is susceptible to modification, variation and change without departing from the proper scope and fair meaning of the accompanying claims.

The invention claimed is:

1. A method for communication signal-based position determination of objects in road traffic, comprising the steps of:
    transmitting wirelessly at least one data-transporting communication signal by at least one sender,
    wherein the at least one communication signal is reflected at least proportionally as a reflection signal by at least one object,
    receiving the at least one communication signal and the reflection signal by a receiver, and wherein the receiver determines a location of the at least one sender,
    determining a propagation time difference between the communication signal and the reflection signal by the receiver and a location of the object by the receiver,
    determining at least one Doppler frequency by mixing the at least one communication signal with an associated one of the reflection signal,
    the receiver, as a result of temporal observation of a change in the Doppler frequency, assigning thereto a relative-speed-dependent distance curve, the profile of the curve containing the position of at least one of the objects.

2. The method as claimed in claim 1, further comprising the step of determining an ellipse from the propagation time difference, the own position and the location, the circumferential line of the ellipse containing a position of at least one of the objects.

3. The method as claimed in claim 1, further comprising the step of determining a Doppler frequency generated by a relative movement of at least one of the objects with respect to a baseline between the receiver and the sender by the receiver from the at least one communication signal and the reflection signal.

4. The method as claimed in claim 1, further comprising the step of filtering the Doppler frequency by means of a digital low-pass filter.

5. The method as claimed in claim 1, further comprising the step of assigning the change in the Doppler frequency to the relative-speed-dependent distance curve by means of a fast Fourier transformation.

6. The method as claimed in claim 1, further comprising the step of providing the receiver capable of the transmitting data-transporting communication signals.

7. The method as claimed in claim 1, further comprising the step of, in the case of a multiplicity of the at least one sender and a multiplicity of the at least one communication signal which is reflected in each case at least proportionally as a multiplicity of the reflection signals at at least one of the objects, the receiver determining in each case a multiplicity of propagation time differences from the multiplicity of the communication signals and an associated one of the reflection signals.

8. The method as claimed in claim 7, further comprising the step of in that the receiver determining a multiplicity of ellipses from a multiplicity of the propagation time differences, wherein at least one intersection point of the multiplicity of ellipses contains the position of the at least one of the objects.

9. The method as claimed in claim 1, further comprising that the method is performed by a multiplicity of the receivers, wherein the multiplicity of the receivers exchange data describing intersection points among one another by means of the communication signals.

10. The method as claimed in claim 1, further comprising the step of the receiver determining a multiplicity of generated Doppler frequencies from a multiplicity of the at least one communication signal and a multiplicity of the reflection signals as a result of a multiplicity of relative movements of a multiplicity of the objects with respect to a baseline between the receiver and the sender.

11. The method as claimed in claim 10, further comprising the step of the receiver, as a result of temporal observation of changes in the multiplicity of Doppler frequencies, assigns to the multiplicity of Doppler frequencies a relative-speed-dependent distance curve, the profiles of which contain the position of at least one of the objects.

12. The method as claimed in claim 10, further comprising the step of superimposing the at least one relative-speed-dependent distance curve and at least one ellipse on a digital position map, wherein the intersection points of the at least one relative-speed-dependent distance curve and the at least one ellipse contain the position of at least one of the objects.

13. The method as claimed in claim 12, further comprising the step of superimposing the at least one relative-speed-dependent distance curve on a road map contained in digital position map, wherein the at least one position of the at least one of the objects is assigned exclusively to a road noted in the digital map.

14. The method as claimed in claim 12, further comprising the step of superimposing the at least one ellipse on a road map contained in digital position map, wherein the at least one position of the at least one of the objects is assigned exclusively to a road noted in the digital position map.

15. The method as claimed in claim 13, further comprising in that the location of the at least one sender is gathered from the digital map material.

16. The method as claimed in claim 1, further comprising the step of in that data transported in a multiplicity of the communication signals are evaluated at least proportionally by the receiver.

17. The method as claimed in claim 1, further comprising the step of in that the location of the at least one sender or of the receiver is contained in data transported by the communication signal.

18. The method as claimed in claim 1, further comprising the step of forwarding the transported data or the positions determined to at least one driver assistance system.

19. The method as claimed in claim 17, further comprising the step of the driver assistance system is designed to perform an autonomous braking intervention or an autonomous steering intervention or a warning to a driver.

20. A device for the communication signal-based position determination of objects in road traffic, comprising:
   a communication unit for wirelessly receiving data-transporting communication signals from senders and for wirelessly receiving reflection signals of the communication signals,
   the reflection signals being reflected by objects,
   location determining means for determining locations of senders of the communication signals,
   position determining means for determining a position of the device, a propagation time difference determining means, and the device is configured to determine the position of the objects,
   Doppler frequency determining means for determining Doppler frequencies generated as a result of relative movements of the objects with respect to a baseline between the receiver and the sender, and
   in that the device furthermore comprises distance assigning means which, as a result of temporal observation of a change in the Doppler frequencies, assign thereto in a relative-speed-dependent distance curve, the profiles of which contain the position of at least one of the objects.

21. The device as claimed in claim 20, further comprising in that the communication unit is configured for simultaneously transmitting and receiving.

22. The device as claimed in claim 20, further comprising in that the location determining means are electronic evaluation means for evaluating at least one proportion of the data and evaluate a location designation of the sender contained in the transported data or are a digital memory which contains digital map material and in which a multiplicity of locations of a multiplicity of senders are designated.

23. The use of the device as claimed in at least claim 20 in a motor vehicle.

* * * * *